United States Patent
Houst et al.

(10) Patent No.: US 9,869,237 B2
(45) Date of Patent: Jan. 16, 2018

(54) TURBOCHARGER WITH COMPRESSOR OPERABLE IN EITHER SINGLE-STAGE MODE OR TWO-STAGE SERIAL MODE

(71) Applicant: Honeywell International Inc., Morristown, NJ (US)

(72) Inventors: Vit Houst, Sestajovice (CZ); Daniel Turecek, Ostopovice (CZ); Vaclav Kares, Strakonice (CZ); Milan Nejedly, Brno (CZ); Ondrej Lednicky, Novy Jicin (CZ); Michal Mokos, Ivancice (CZ); Zbynek Oslejsek, Suchdol (CZ)

(73) Assignee: Honeywell International Inc., Morris Plains, NJ (US)

( * ) Notice: Subject to any disclaimer, the term of this patent is extended or adjusted under 35 U.S.C. 154(b) by 329 days.

(21) Appl. No.: 14/829,802

(22) Filed: Aug. 19, 2015

(65) Prior Publication Data

US 2017/0051661 A1    Feb. 23, 2017

(51) Int. Cl.
*F02B 37/16* (2006.01)
*F02B 37/24* (2006.01)
(Continued)

(52) U.S. Cl.
CPC ............... *F02B 37/16* (2013.01); *F01D 5/02* (2013.01); *F01D 25/24* (2013.01); *F02B 33/40* (2013.01);
(Continued)

(58) Field of Classification Search
CPC ........ F04D 17/12; F04D 17/122; F04D 17/14; F02B 37/16; F02B 37/24; F02B 2037/162;
(Continued)

(56) References Cited

U.S. PATENT DOCUMENTS 2,216,074 A * 9/1940 Garve .................... F02B 33/44
123/58.4
2,387,560 A * 10/1945 Boulet ................... F02B 33/00
60/600

(Continued)

FOREIGN PATENT DOCUMENTS

CH        238900 A  *  8/1945  ............. F02B 33/44
EP     1215378 A2  *  6/2002  ............ F02B 37/013

OTHER PUBLICATIONS

European Search Report & Opinion for EP Application No. 16183904.8 dated Jan. 10, 2017.

*Primary Examiner* — Phutthiwat Wongwian
*Assistant Examiner* — Jessica Kebea
(74) *Attorney, Agent, or Firm* — John C. James

(57) ABSTRACT

A turbocharger includes a two-stage serial compressor having first and second impellers, with a crossover duct for leading air from the first impeller into the second impeller for further compression. The compressor housing also defines a bypass duct from the crossover duct to the air discharge duct from the compressor, and a bypass valve disposed in the bypass duct. Under certain operating conditions (such as high-flow, low-pressure-ratio conditions) the bypass valve can be opened to bypass the second impeller, such that the compressor behaves like a single-stage compressor. At other operating conditions, the bypass valve is closed so that the compressor provides two-stage compression for higher pressure ratios.

7 Claims, 5 Drawing Sheets

(51) Int. Cl.
  *F01D 5/02* (2006.01)
  *F01D 25/24* (2006.01)
  *F02B 33/44* (2006.01)
  *F04D 17/12* (2006.01)
  *F04D 17/14* (2006.01)
  *F04D 25/04* (2006.01)
  *F04D 27/02* (2006.01)
  *F04D 29/42* (2006.01)
  *F02C 6/12* (2006.01)
  *F02B 33/40* (2006.01)

(52) U.S. Cl.
  CPC ............... *F02B 37/24* (2013.01); *F02C 6/12* (2013.01); *F04D 17/12* (2013.01); *F04D 17/122* (2013.01); *F04D 17/14* (2013.01); *F04D 25/04* (2013.01); *F04D 27/0269* (2013.01); *F04D 29/4206* (2013.01); *F02B 2037/162* (2013.01); *F05D 2220/40* (2013.01); *F05D 2260/606* (2013.01); *Y02T 10/144* (2013.01)

(58) Field of Classification Search
  CPC ............... F02B 33/40; F05D 2220/40; F05D 2260/606; F01D 25/24; F01D 5/02; Y02T 10/144
  See application file for complete search history.

(56) References Cited

U.S. PATENT DOCUMENTS

| | | | |
|---|---|---|---|
| 2,819,836 A * | 1/1958 | Eberle | F04D 17/122 415/144 |
| 3,143,103 A * | 8/1964 | Zuhn | F02B 29/0481 415/143 |
| 5,157,924 A * | 10/1992 | Sudmanns | F02B 37/00 60/612 |
| 5,406,796 A * | 4/1995 | Hiereth | F02B 37/005 60/605.2 |
| 6,293,103 B1 * | 9/2001 | Gladden | F02B 33/446 415/1 |
| 6,324,848 B1 | 12/2001 | Gladden et al. | |
| 6,345,503 B1 * | 2/2002 | Gladden | F02B 37/013 415/120 |
| 6,357,234 B1 * | 3/2002 | Gladden | F02B 37/001 415/11 |
| 6,834,501 B1 * | 12/2004 | Vrbas | F01D 5/045 123/562 |
| 6,948,314 B2 | 9/2005 | Arnold et al. | |
| 7,014,418 B1 | 3/2006 | Arnold et al. | |
| 7,305,827 B2 | 12/2007 | Arnold et al. | |
| 8,181,462 B2 * | 5/2012 | Arnold | F01D 5/048 60/612 |
| 8,453,445 B2 | 6/2013 | Lotterman et al. | |
| 8,453,448 B2 | 6/2013 | Lotterman et al. | |
| 8,468,826 B2 | 6/2013 | Kares et al. | |
| 8,850,813 B2 | 10/2014 | Lotterman | |
| 2005/0103013 A1 * | 5/2005 | Brookshire | F02B 37/001 60/605.2 |
| 2011/0038737 A1 | 2/2011 | Conry et al. | |
| 2015/0113982 A1 | 4/2015 | Kares | |
| 2015/0159660 A1 | 6/2015 | Kares et al. | |
| 2015/0198163 A1 | 7/2015 | Lei et al. | |
| 2017/0016385 A1 * | 1/2017 | Kindl | F02B 29/02 |

\* cited by examiner

TURBOCHARGER WITH COMPRESSOR OPERABLE IN EITHER SINGLE-STAGE MODE OR TWO-STAGE SERIAL MODE

BACKGROUND OF THE INVENTION

This application relates generally to turbochargers for internal combustion engines.

Exhaust gas-driven turbochargers employ a turbine to extract power from the stream of exhaust gas coming from an internal combustion engine and use that power to drive a compressor in order to boost the pressure of the air supplied to the cylinders. Single-stage centrifugal compressors are often designed to produce peak pressure ratios of 4.0 or more. In some applications, however, higher pressure ratios are desired, in which case it is common to employ two-stage serial compressors. A two-stage serial compressor has two impellers mounted on the same shaft, sometimes in a back-to-back configuration. Air pressurized by the first-stage impeller is routed to the inlet of the second-stage impeller, where the air is further pressurized and then supplied to the intake manifold of the engine. Using this technique, peak pressure ratios of 7.0 or more can be achieved.

One drawback of two-stage serial compressors is that at operating conditions having relatively high flow rates but low pressure ratios, the efficiency of the compressor falls off dramatically.

SUMMARY OF THE DISCLOSURE

An objective of the present invention is to at least partially alleviate the problem of efficiency fall-off at high-flow, low-pressure-ratio conditions in two-stage serial compressors. The present disclosure describes a turbocharger operable in either single-stage compression mode or two-stage serial compression mode, the mode of operation being selectable depending on the operating condition of the engine/turbocharger. In one embodiment described herein, the turbocharger comprises a turbine comprising a turbine wheel and a turbine housing, the turbine wheel being affixed to one end of a rotatable shaft, the turbine housing defining an axial bore therethrough in which the turbine wheel is disposed, an exhaust gas inlet, a generally annular turbine volute surrounding the turbine wheel, and a nozzle leading from the turbine volute into the turbine wheel. The turbocharger further comprises a compressor comprising a compressor wheel and a compressor housing, the compressor wheel being affixed to an opposite end of the shaft and being disposed in the compressor housing, the compressor wheel comprising a first impeller and a second impeller. The compressor housing defines a first air inlet for leading air into the first impeller, a second air inlet for leading air into the second impeller, a first compressor volute surrounding the first impeller and configured for receiving air pressurized by the first impeller, a crossover duct configured to lead pressurized air from the first compressor volute into the second air inlet, a second compressor volute surrounding the second impeller and configured for receiving air pressurized by the second impeller, and an air discharge duct configured to lead air from the second compressor volute and out of the compressor housing for delivery to an intake manifold of an internal combustion engine.

The compressor housing further defines a bypass duct extending from one of the first compressor volute and the crossover duct, to the air discharge duct, and a bypass valve disposed in the bypass duct, the bypass valve being movable between a closed position and an open position. The closed position prevents pressurized air in the first compressor volute from proceeding along the bypass duct so as to bypass the second impeller, while the open position allows pressurized air in the first compressor volute to proceed along the bypass duct so as to bypass the second impeller.

When the engine operating condition calls for moderate to high flow rate and low pressure ratio from the compressor, the bypass valve can be moved to the open position, which allows pressurized air to proceed directly from the first compressor volute through the bypass duct into the air discharger duct. Accordingly, the compressor behaves essentially like a single-stage compressor, because the second impeller contributes very little to the overall pressure ratio developed by the compressor. Improved efficiency is thus achieved at such high-flow, low-pressure-ratio conditions.

In other operating regimes, the bypass valve can be positioned in the closed position such that the compressor operates in two-stage serial mode.

In accordance with one embodiment, the bypass valve comprises a butterfly valve.

The first and second impellers can be arranged in a back-to-back configuration. The first air inlet leads air into the first impeller in a first axial direction and the second air inlet leads air into the second impeller in a second axial direction opposite to the first axial direction. The crossover duct is configured to lead pressurized air out of the first compressor volute, then generally along the first axial direction past the second compressor volute, then into the second air inlet, the second air inlet being configured to lead the pressurized air generally radially inwardly and then to turn the pressurized air to proceed generally along the second axial direction into the second impeller.

In one embodiment, the bypass duct extends between the crossover duct and the air discharge duct. Alternatively, the bypass duct can extend between the first compressor volute and the air discharge duct.

The invention is applicable to various types of exhaust gas-driven turbochargers. In one embodiment, the nozzle of the turbine further comprises a variable-vane assembly regulating exhaust gas flow into the turbine wheel. Alternatively, the invention can be applied to turbochargers having non-variable nozzle geometry and/or turbochargers having a variable waste gate for the turbine.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
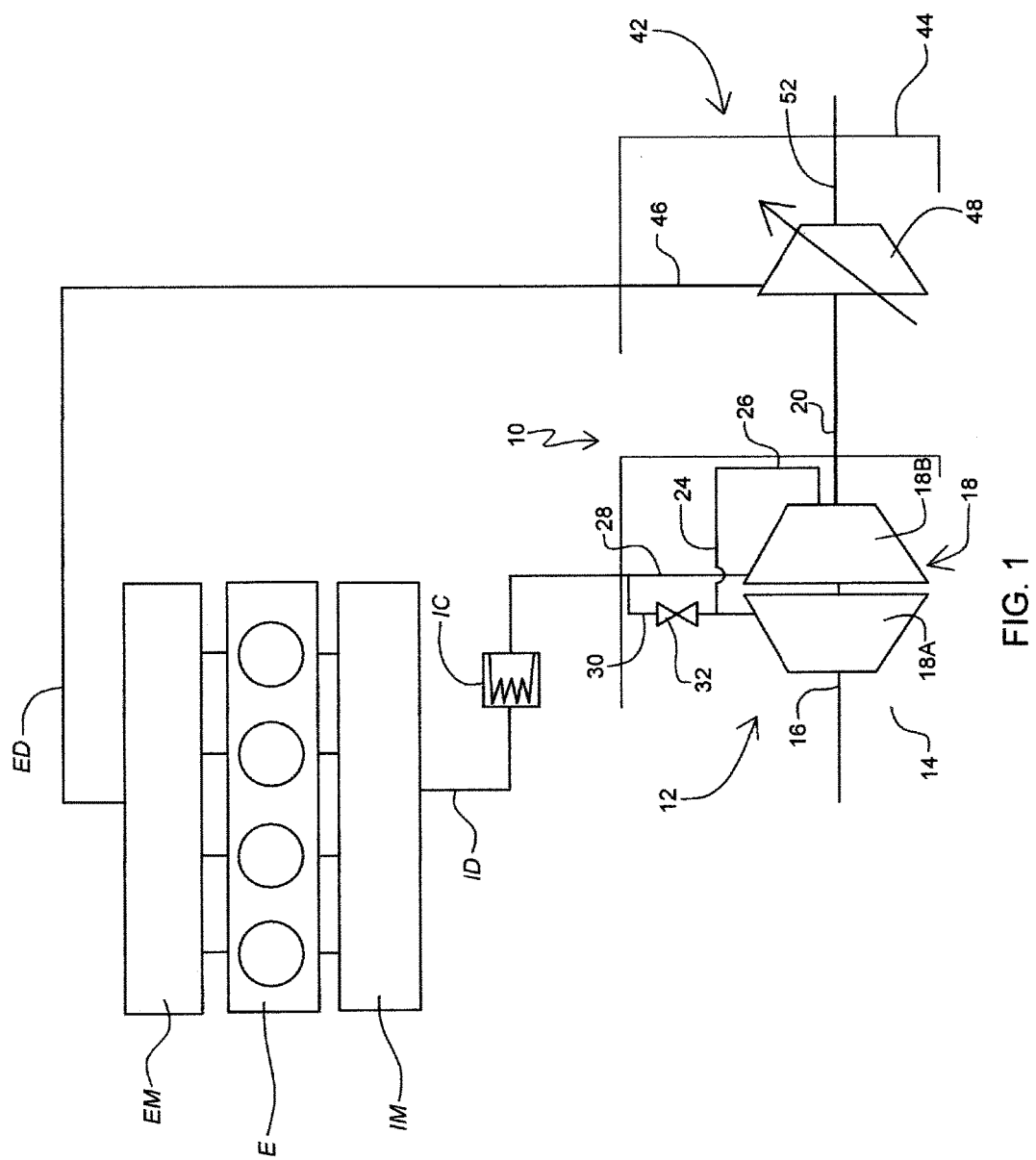
FIG. 1 is a schematic depiction of a turbocharged engine system in accordance with an embodiment of the invention.

FIG. 1 is a schematic illustration of an engine and turbocharger system having features of the present invention in accordance with one embodiment thereof. An internal combustion engine E has an intake manifold IM and an exhaust manifold EM. Air is supplied to the intake manifold by an intake duct ID. Fuel is mixed with the air in the cylinders of the engine and the mixture is combusted and the combustion gases are exhausted from the cylinders into the exhaust manifold. Exhaust gases are led from the exhaust manifold via an exhaust duct ED.

The system includes a turbocharger 10 for boosting the pressure of the air delivered to the intake manifold. The turbocharger comprises a compressor 12 having a compressor housing 14 that forms an axially extending first air inlet 16 for leading air into a compressor wheel 18 mounted in the compressor housing and affixed to one end of a rotatable shaft 20. The compressor wheel comprises a first impeller 18A and a second impeller 18B. The compressor housing defines a crossover duct 24 for leading air pressurized by the first impeller into a second air inlet 26 in the compressor housing. The second air inlet leads air into the second impeller, which further pressurizes the air. The compressor housing defines an air discharge duct 28 for leading pressurized air out of the compressor housing into the intake duct ID for the engine. Typically an intercooler IC is included for cooling the pressurized air before it is delivered into the intake manifold IM.

The turbocharger further comprises a turbine 42 having a turbine housing 44 that defines an exhaust gas inlet 46 that receives exhaust gases from the exhaust duct ED coming from the engine's exhaust manifold. A turbine wheel 48 is affixed to the shaft 20 and is disposed in the turbine housing. Exhaust gases are fed into the turbine wheel, which expands the gases and is rotatably driven by the gases so as to rotatably drive the compressor wheel 18 via the shaft 20. The turbine housing defines an axial bore 52 through which exhaust gases that have passed through the turbine wheel are exhausted from the turbine housing.

The compressor housing 14 defines a bypass duct 30 that extends between the crossover duct 24 and the air discharge duct 28. A bypass valve 32 is disposed in the bypass duct 30. The bypass valve 32 is movable between an open position and a closed position. When the bypass valve 32 is closed, air cannot pass through the bypass duct 30, and accordingly the air pressurized by the first impeller 18A is led through the crossover duct 24 into the second air inlet 26, and from there into the second impeller 18B for additional pressurization. Thus, two-stage serial compression takes place, and the pressurized air is then fed through the air discharge duct 28 to be supplied to the intake manifold of the engine.

When the bypass valve 32 is opened, pressurized air from the first impeller 18A passes through the bypass duct 30 into the discharge duct 28 without first passing through the second impeller 18B. Accordingly, this air has undergone only single-stage pressurization in the first impeller. A small amount of air may still pass through the crossover duct into the second air inlet and then through the second impeller. However, the amount of air passing through the second impeller is insignificant in comparison with the amount that bypasses the second impeller. Thus, the second impeller's contribution to the overall pressure ratio of the compressor is insignificant, such that the compressor behaves like a single-stage compressor.

Figure 2:
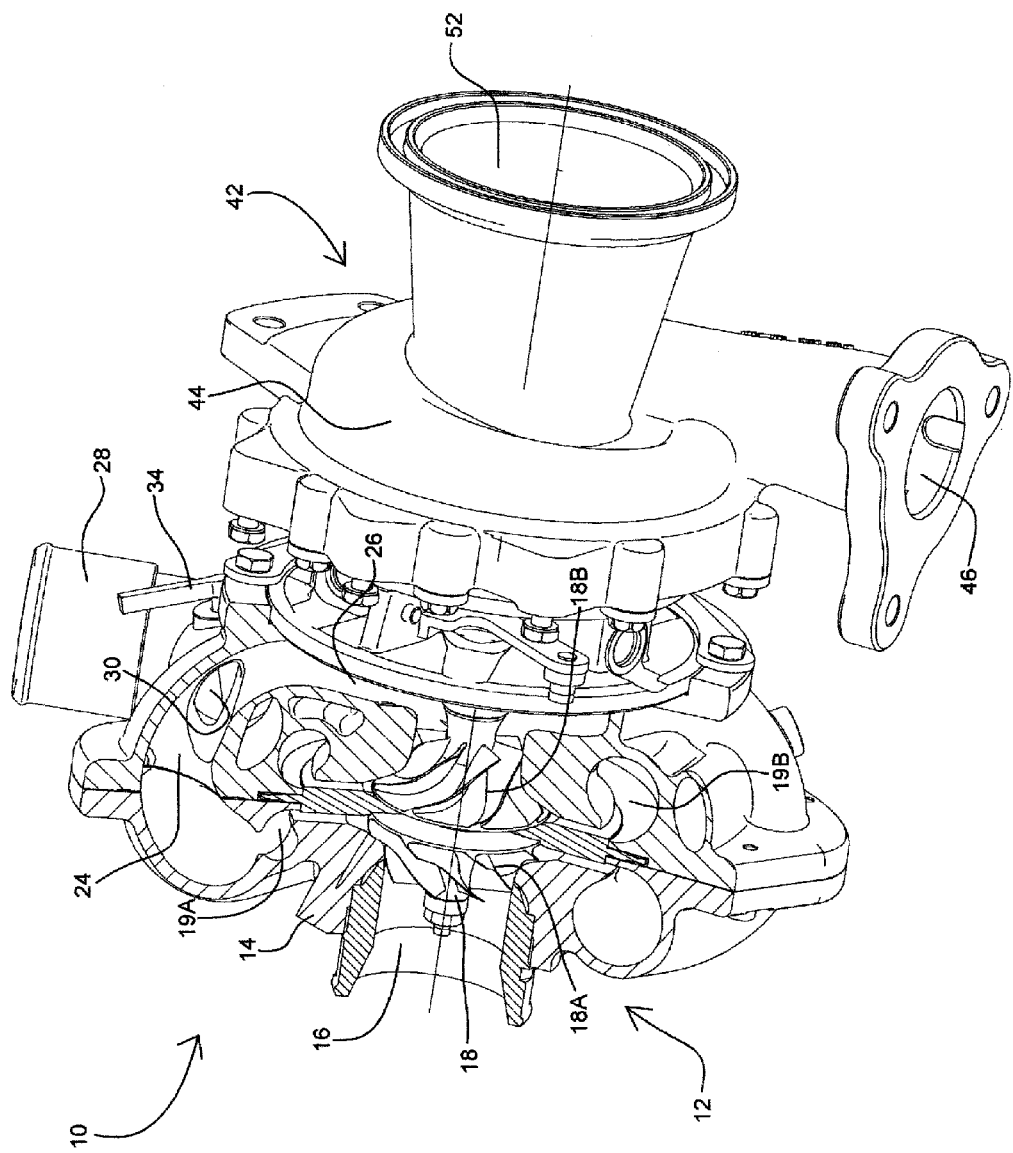
FIG. 2 is a perspective view of a turbocharger in accordance with an embodiment of the invention, with the compressor housing partially removed to show internal details of the compressor.

With reference to FIGS. 2-5, an embodiment of a turbocharger 10 having the aforementioned features is now described in further detail. As noted, the compressor wheel comprises a first impeller 18A and a second impeller 18B. The compressor housing defines a first compressor volute 19A that receives air pressurized by the first impeller 18A, and a second compressor volute 19B that receives air pressurized by the second impeller 18B. The crossover duct 24 (as best seen in FIG. 2) connects with the first volute 19A and extends generally axially past (and radially outward of) the second volute 19B, and connects with the second air inlet 26. The second air inlet 26 extends generally radially inwardly and then turns about 90 degrees to extend generally axially for leading air into the second impeller 18B in a direction opposite to the direction that air enters the first impeller 18A. Thus, pressurized air in the first compressor volute 19A is led via the crossover duct 24 into the second air inlet 26 and from there, into the second impeller 18B for further pressurization, then being discharged into the second compressor volute 19B. The air discharge duct 28 connects with the second compressor volute 19B for leading the air out of the compressor housing for delivery to the engine intake.

Figure 3:
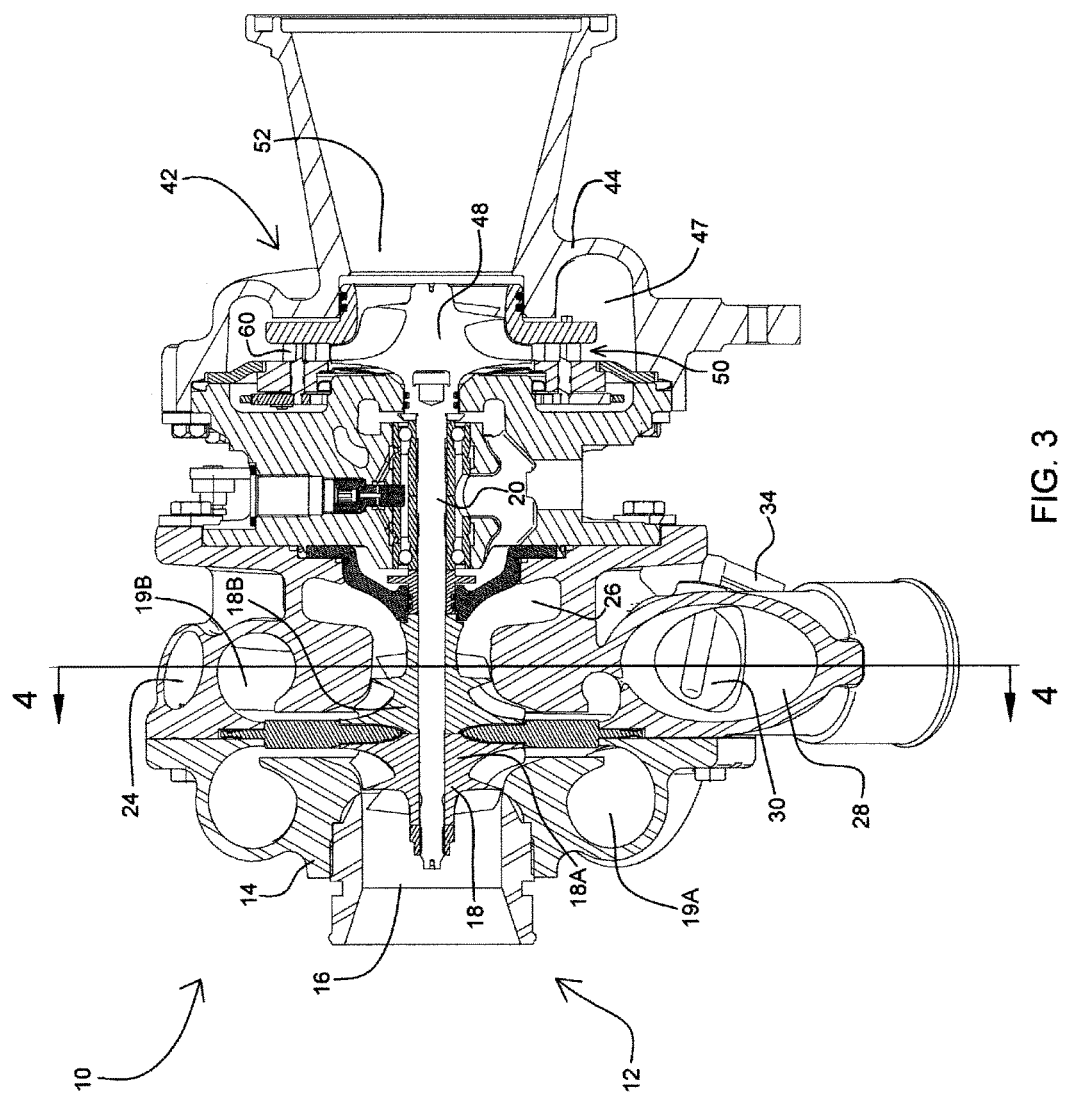
FIG. 3 is an axial cross-sectional view of the turbocharger of FIG. 2.
Figure 4:
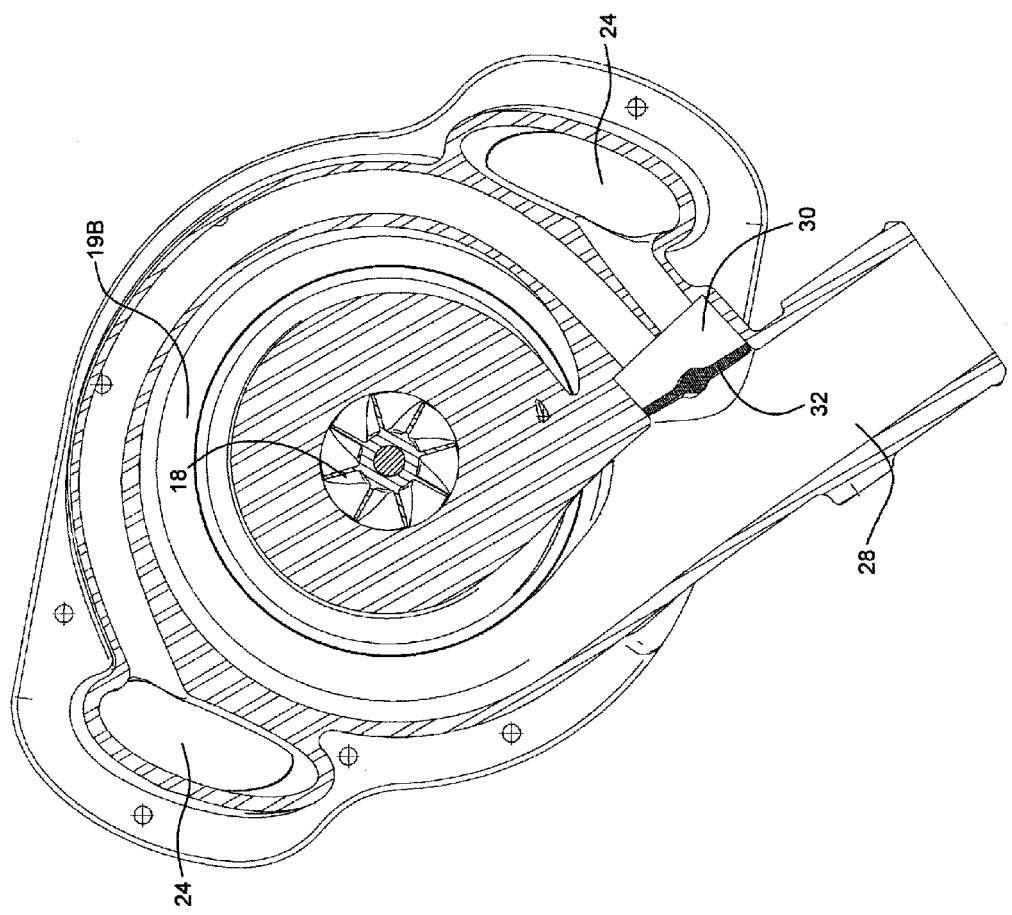
FIG. 4 is a cross-sectional view along line 4-4 in FIG. 3, with the bypass valve in the closed position.

The compressor housing defines a bypass duct 30 that connects at one end to the first compressor volute 19A and at its opposite end to the air discharge duct 28, as best seen in FIGS. 2 and 4. A bypass valve 32 is disposed in the bypass duct 30. In the illustrated embodiment the bypass duct is round and the bypass valve comprises a butterfly valve having a generally circular valve plate mounted on an axle that defines an axis about which the valve plate rotates, the axle being along a diameter of the circular valve plate. The axle is connected to a handle or lever 34 disposed outside the compressor housing, as shown in FIGS. 2 and 3. An actuator (not shown) is connected to the lever 34 for moving the valve between the open and closed positions. In the closed position shown in FIG. 4, the circular plate is perpendicular to the axis of the bypass duct 30 and substantially fills the duct so that air is substantially prevented from passing the plate. In the open position shown in FIG. 5, the circular plate is parallel to the duct axis and presents only a small blockage to the air flowing in the duct, thereby allowing air to bypass the second impeller 18B and proceed directly to the air discharge duct 28. It will be understood that while the bypass valve is described as being a butterfly valve in the particular embodiment described herein, the invention is not limited to any specific type of valve, and valves of various types can be used instead.

In the illustrated embodiment, the turbine 42 includes a variable nozzle 50 having an array of vanes 60 that are pivotable about their respective axes for regulating flow into the turbine wheel 48. The variable nozzle can be constructed generally as described in commonly owned U.S. Pat. No. 7,559,199, the entire disclosure of which is hereby incorporated herein by reference. Alternatively, the invention can be applied to turbochargers having fixed-nozzle turbines. The invention is not limited to any particular turbocharger architecture.

Figure 5:
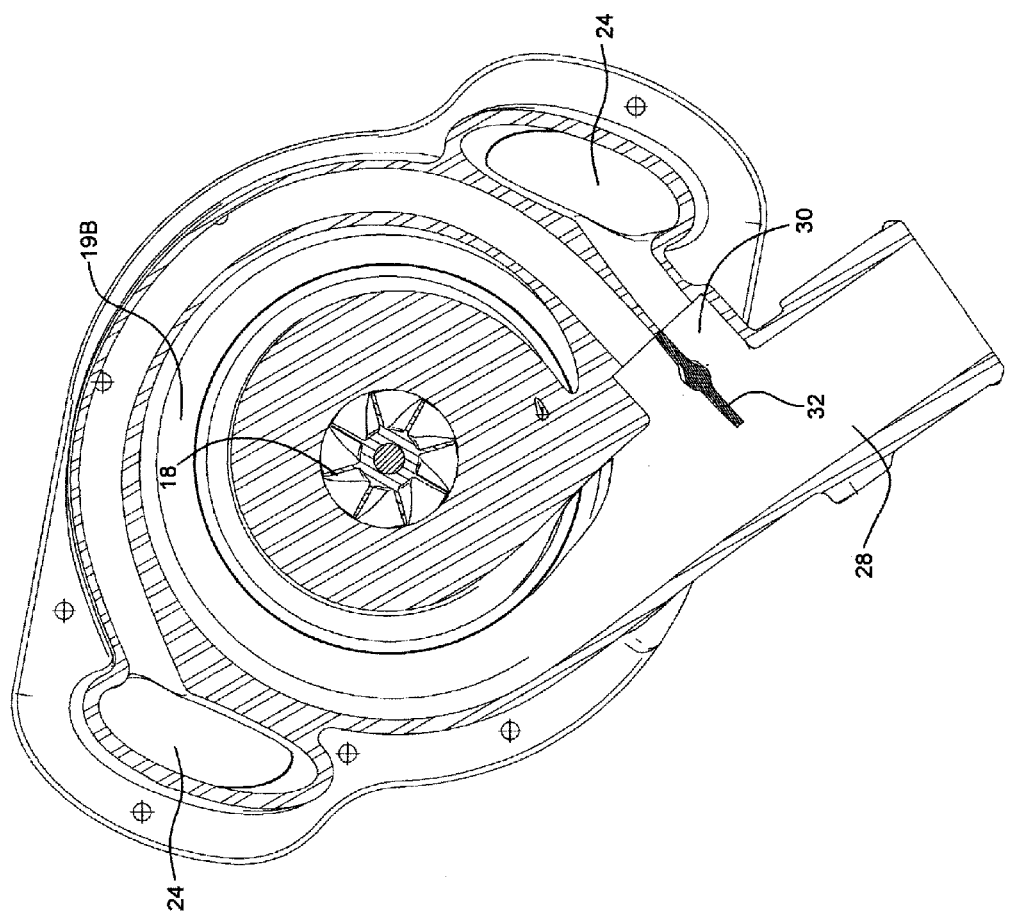
FIG. 5 is a view similar to FIG. 4 but with the bypass valve in the open position.

In accordance with the invention, the turbocharger 10 can be operated in either a single-stage compression mode or a two-stage serial compression mode. At some operating conditions (e.g., those calling for moderate to high pressure ratios, such as higher than about 3.0 or 3.5), the compressor can be operated in the two-stage serial mode, by placing the bypass valve 30 in the closed position (FIG. 4). At other operating conditions (e.g., those calling for low pressure ratios, such as lower than about 3.0 or 3.5, together with moderate to high air flow rates), the compressor can be operated in the single-stage mode by placing the bypass valve in the open position (FIG. 5).

Various algorithms can be used for determining when the bypass valve should be closed and when it should be open. For example, as noted, the bypass valve position can be dependent on a combination of air mass flow rate (corrected to standard temperature and pressure) and desired compressor pressure ratio. A controller for the bypass valve can employ a table lookup based on corrected flow rate and pressure ratio, or can store a curve of pressure ratio versus corrected flow representing the locus of threshold points between one compressor map regime in which the valve is closed and another map regime in which the valve is open.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims. For example, while a back-to-back twin-impeller compressor wheel is illustrated and described herein, the invention is also applicable to twin-impeller compressor wheels of other architectures, such as those having both impellers oriented in the same direction and having suitable ducting for routing air from the first impeller to the second impeller. Other variations that do not depart from the described inventive concept are also included within the scope of the appended claims.

What is claimed is:

1. A turbocharger operable in either single-stage compression mode or two-stage serial compression mode, comprising:
    a turbine comprising a turbine wheel and a turbine housing, the turbine wheel being affixed to one end of a rotatable shaft, the turbine housing defining an axial bore therethrough in which the turbine wheel is disposed, an exhaust gas inlet, a annular turbine volute surrounding the turbine wheel, and a nozzle leading from the turbine volute into the turbine wheel;
    a compressor comprising a compressor wheel and a compressor housing, the compressor wheel being affixed to an opposite end of the rotatable shaft and being disposed in the compressor housing, the compressor wheel comprising a first impeller and a second impeller, the compressor housing defining a first air inlet for leading air into the first impeller, a second air inlet for leading air into the second impeller, a first compressor volute surrounding the first impeller and configured for receiving air pressurized by the first impeller, a crossover duct configured to lead pressurized air from the first compressor volute into the second air inlet, and a second compressor volute surrounding the second impeller and configured for receiving air pressurized by the second impeller, and an air discharge duct configured to lead air from the second compressor volute and out of the compressor housing for delivery to an intake manifold of an internal combustion engine;
    the compressor housing further defining a bypass duct extending from one of the first compressor volute and the crossover duct, to the air discharge duct; and
    a bypass valve disposed in the bypass duct, the bypass valve being movable between a closed position and an open position, the closed position preventing pressurized air in the first compressor volute from proceeding along the bypass duct so as to bypass the second impeller, the open position allowing pressurized air in the first compressor volute to proceed along the bypass duct so as to bypass the second impeller.

2. The turbocharger of claim 1, wherein the bypass valve comprises a butterfly valve.

3. The turbocharger of claim 1, wherein the first and second impellers are arranged in a back-to-back configuration.

4. The turbocharger of claim 3, wherein the first air inlet leads air into the first impeller in a first axial direction and the second air inlet leads air into the second impeller in a second axial direction opposite to the first axial direction.

5. The turbocharger of claim 4, wherein the crossover duct is configured to lead pressurized air out of the first compressor volute, then along the first axial direction past the second compressor volute, then into the second air inlet, the second air inlet being configured to lead the pressurized air radially inwardly and then to turn the pressurized air to proceed along the second axial direction into the second impeller.

6. The turbocharger of claim 5, wherein the bypass duct extends between the crossover duct and the air discharge duct.

7. The turbocharger of claim 1, wherein the nozzle of the turbine further comprises a variable-vane assembly regulating exhaust gas flow into the turbine wheel.

* * * * *